(12) United States Patent
Grabowska

(10) Patent No.: US 8,499,557 B2
(45) Date of Patent: Aug. 6, 2013

(54) VARIABLE FLOW WASTEGATE

(75) Inventor: David G. Grabowska, Asheville, NC (US)

(73) Assignee: BorgWarner Inc., Auburn Hills, MI (US)

( * ) Notice: Subject to any disclaimer, the term of this patent is extended or adjusted under 35 U.S.C. 154(b) by 208 days.

(21) Appl. No.: 13/121,033

(22) PCT Filed: Sep. 25, 2009

(86) PCT No.: PCT/US2009/058322
§ 371 (c)(1),
(2), (4) Date: Mar. 25, 2011

(87) PCT Pub. No.: WO2010/039596
PCT Pub. Date: Apr. 8, 2010

(65) Prior Publication Data
US 2011/0173974 A1    Jul. 21, 2011

Related U.S. Application Data

(60) Provisional application No. 61/101,750, filed on Oct. 1, 2008.

(51) Int. Cl.
*F02D 23/00* (2006.01)
*B22D 41/16* (2006.01)
*F16K 1/16* (2006.01)

(52) U.S. Cl.
USPC .............................. 60/602; 251/356; 251/298

(58) Field of Classification Search
USPC ................... 60/602; 251/356, 205, 298, 299, 251/118, 120; 137/219
See application file for complete search history.

(56) References Cited

U.S. PATENT DOCUMENTS

| | | | | |
|---|---|---|---|---|
| 167,397 A * | 9/1875 | Franke | | 251/298 |
| 200,416 A * | 2/1878 | Waddel | | 251/261 |
| 673,651 A * | 5/1901 | Baldt | | 251/356 |
| 695,046 A * | 3/1902 | Granton | | 251/298 |
| 791,382 A * | 5/1905 | Turro | | 251/120 |
| 1,688,876 A * | 10/1928 | Palmer | | 251/356 |
| 2,017,033 A * | 10/1935 | McGuffin | | 137/513 |
| 2,069,309 A * | 2/1937 | Henszey | | 251/205 |
| 2,285,533 A * | 6/1942 | Roof | | 251/356 |
| 2,364,107 A * | 12/1944 | Svirsky | | 251/120 |
| 2,992,806 A * | 7/1961 | Kanter et al. | | 251/298 |
| 3,327,992 A * | 6/1967 | Nelson et al. | | 251/120 |
| 3,503,585 A * | 3/1970 | Vogeli | | 251/205 |
| 3,531,086 A * | 9/1970 | Shannon | | 251/356 |

(Continued)

FOREIGN PATENT DOCUMENTS

| JP | 54138921 A * | 10/1979 |
|---|---|---|
| JP | 61038275 A * | 2/1986 |

(Continued)

*Primary Examiner* — Thai Ba Trieu
(74) *Attorney, Agent, or Firm* — William G. Anderson; Stephan A. Pendorf; Patent Central LLC

(57) ABSTRACT

A wastegate for a turbocharger wherein the valve is provided with a horn to provide a more progressive, optimally near linear, curve of turbocharger boost-to-valve opening than possible with the typical flat wastegate valve. The addition of a three-dimensional horn in the flow path is a far more cost-effective solution to acquire linear flow than an approach involving very finite, accurate control of the valve position.

15 Claims, 13 Drawing Sheets

U.S. PATENT DOCUMENTS

| | | | | |
|---|---|---|---|---|
| 3,861,646 A * | 1/1975 | Douglas | | 251/356 |
| 4,211,081 A * | 7/1980 | Yamada | | 60/602 |
| 4,256,285 A * | 3/1981 | Davidson | | 251/298 |
| 4,375,821 A * | 3/1983 | Nanao | | 251/120 |
| 4,531,532 A * | 7/1985 | Zimmerly | | 251/357 |
| 5,950,660 A * | 9/1999 | Hartman et al. | | 137/219 |
| 6,056,270 A * | 5/2000 | Zimmerly | | 251/368 |
| 6,082,405 A * | 7/2000 | Qvarfordh et al. | | 137/625.37 |
| 6,250,079 B1 * | 6/2001 | Zander et al. | | 60/602 |
| 6,378,842 B1 * | 4/2002 | Frese et al. | | 251/298 |
| 6,926,249 B2 * | 8/2005 | Erickson et al. | | 251/205 |
| 6,969,048 B2 * | 11/2005 | Colic et al. | | 251/356 |
| 7,493,912 B2 * | 2/2009 | Hartman et al. | | 137/219 |
| 7,708,024 B2 * | 5/2010 | Hartman et al. | | 137/219 |
| 8,038,121 B2 * | 10/2011 | Gessaman | | 251/205 |
| 8,205,448 B2 * | 6/2012 | Koch et al. | | 251/356 |
| 8,209,979 B2 * | 7/2012 | Wang et al. | | 60/602 |
| 2006/0042246 A1 * | 3/2006 | Gray et al. | | 60/612 |
| 2008/0237526 A1 * | 10/2008 | Albert et al. | | 251/356 |
| 2011/0005222 A1 * | 1/2011 | Hayashi et al. | | 60/602 |
| 2011/0011085 A1 * | 1/2011 | Garrett et al. | | 60/602 |
| 2011/0099998 A1 * | 5/2011 | Serres et al. | | 60/602 |

FOREIGN PATENT DOCUMENTS

| | | | |
|---|---|---|---|
| JP | 05209689 A | * | 8/1993 |
| JP | 06002771 A | * | 1/1994 |
| JP | 2011179401 A | * | 9/2011 |
| WO | WO 2007048903 A1 | * | 5/2007 |

* cited by examiner

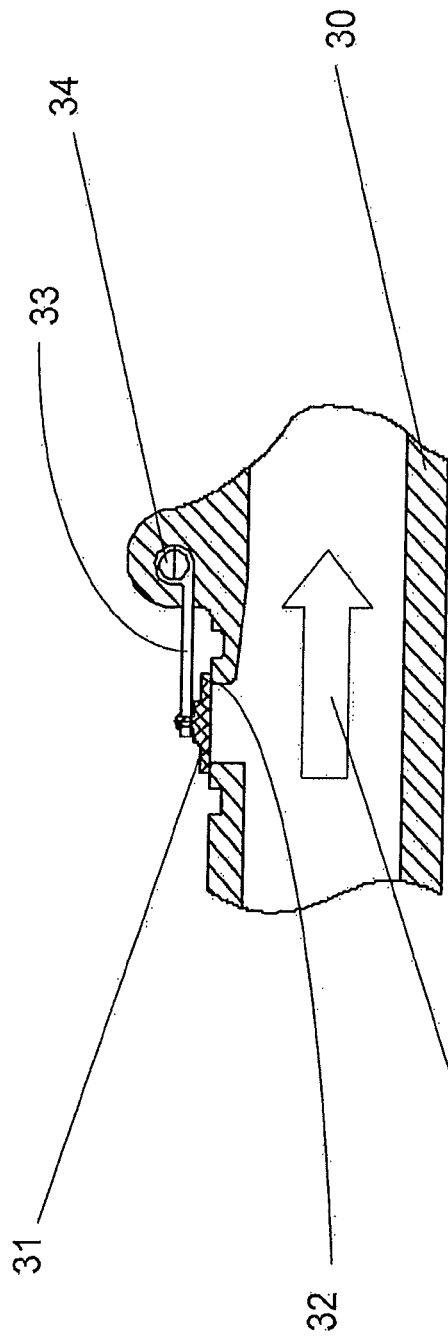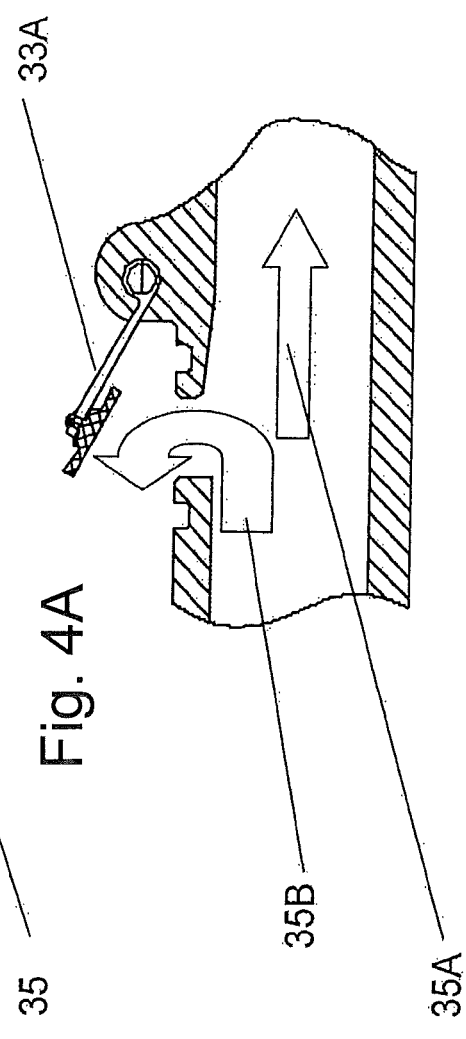
Fig. 4A
Fig. 4B

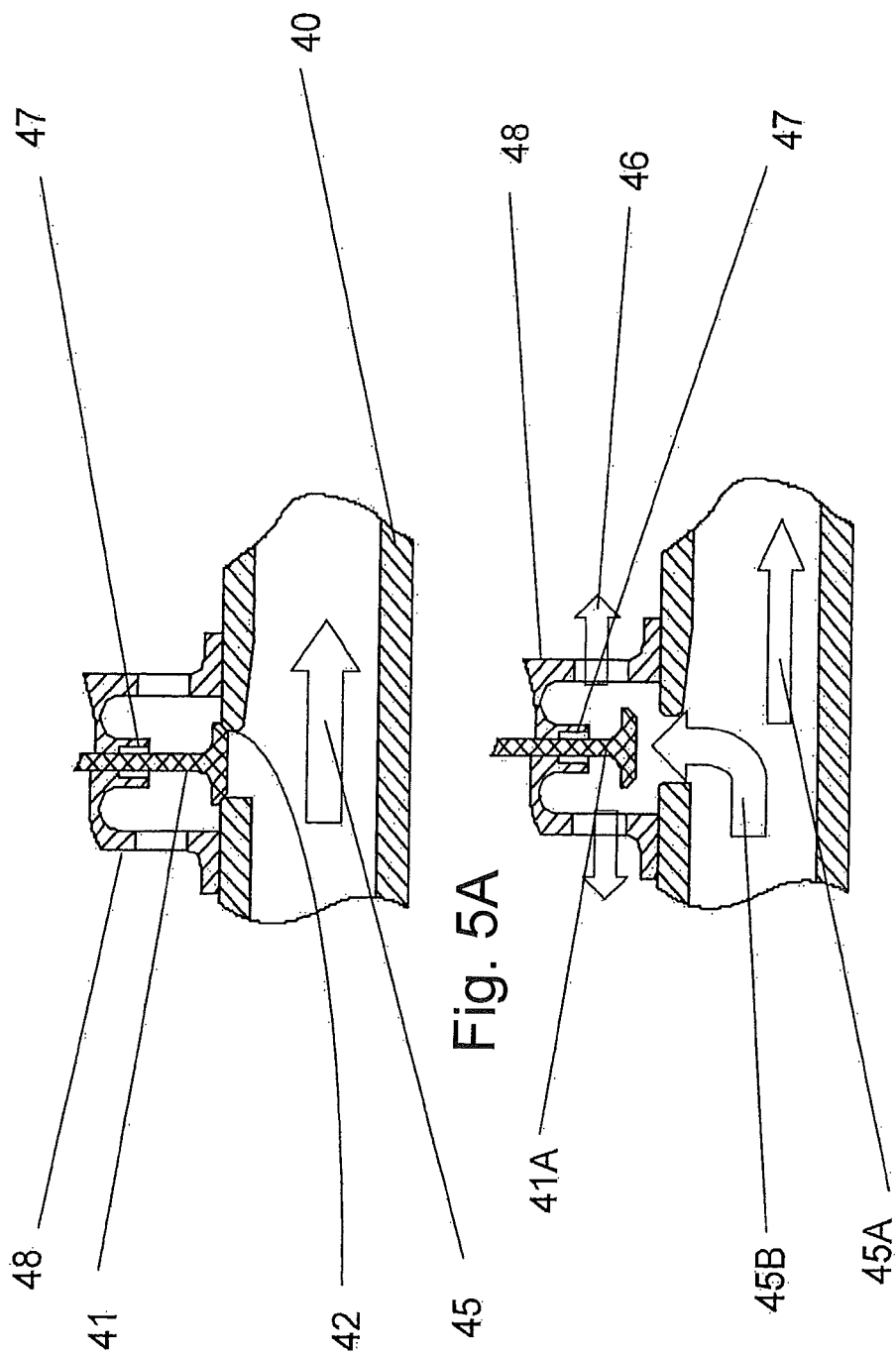

(# VARIABLE FLOW WASTEGATE

FIELD OF THE INVENTION

This invention is directed to the design of a wastegate flow path such that it produces a more progressive (consistent, most optimally near-linear) curve of flow through the orifice consisting of the stationary and dynamic valve components for a more progressive displacement of the valve.

BACKGROUND OF THE INVENTION

Turbochargers are a type of forced induction system. They deliver compressed air to the engine intake, allowing more fuel to be combusted, thus boosting the engine's horsepower without significantly increasing engine weight. This can enable the use of a smaller turbocharged engine, replacing a normally aspirated engine of a larger physical size, thus reducing the mass and aerodynamic frontal area of the vehicle.

Turbochargers use the exhaust flow from the engine exhaust manifold to drive a turbine wheel located in a turbine housing. The turbine wheel is solidly affixed to one end of a shaft. A compressor wheel is mounted to the other end of the shaft and held in position by the clamp load from the compressor nut. A bearing housing (1) rotationally supports the shaft. The primary function of the turbine wheel is simply to provide rotational power to drive the compressor. In EGR type engine systems a function of the turbine stage is to control the backpressure in the exhaust system to enable EGR flow to be driven, from the exhaust system, into the engine inlet system.

The power developed by the turbine stage is a function of the expansion ratio across the turbine stage. That is, the expansion ratio from the turbine inlet to the turbine exducer.

The compressor stage consists of a wheel and its housing. Filtered air is drawn axially into the inlet of the compressor cover (20) by the rotation of the compressor wheel (21). The power delivered by the turbine stage to the shaft drives the compressor wheel to produce a combination of static pressure with some residual kinetic energy and heat.

In a turbocharged engine system there is a basic mismatch between the engine output and the turbocharger output. Since an internal combustion (IC) engine is a positive displacement device the flow rate is approximately proportional to the engine speed $N_e$. A turbocharger is a rotordynamic device, whose characteristics are analogous to a simple throttle, and so the flow rate is, to a large extent, independent of its speed $N_t$. The expansion ratio across the turbocharger increases as the square of the flow rate. Because of this the turbocharger is really only ideally matched to the engine at one operating point.

From a matching standpoint, if the engine application is, for example, and on-highway truck, then the sweet spot for the match will most likely be at the engine rated point. Determining that the sweet spot for the match is at rated point will produce less favorable matching at, for example, the low engine speed operating point. This will mean that the engine will be more likely to produce more particulates in the engine low speed range than desired by the engine manufacturer (to meet emissions regulations) and the engine will not feel responsive to the driver. If, on the other hand, the turbocharger is matched to the engine low speed point, the $N_e$ engine performance will be better, the turbocharger-engine combination will have improved transient performance and the particulates emissions will be reduced. However at $N_e$ the turbocharger will over-boost the engine. To resolve the $N_e$ over-boost issue, a wastegate is used to reduce the turbine power to the compressor and thus reduce the boost pressure at this engine operating point.

FIG. 2 depicts a typical map for a compressor stage. The Y axis (25) is the pressure ratio, the X axis (26) is the mass flow rate in Kg/sec. The left boundary is the surge line (21). This is a test-generated line. At each speed line, the surge point is detected, noted, then interpolated for the entire map. At the surge point, oscillatory flow behavior causes a flow blockage. In the surge condition the flow detaches from the suction surface of the blade causing instability in the flow, which oscillates as the flow attaches and detaches from the blade. The surge condition moves with installation conditions so it must be tested for each set of installation parameters. In the surge condition the turbo reacts violently and must be kept out of this operating regime.

The right boundary is the choke line (24). This line is generated by selecting a minimum value of efficiency (often 65%), on each speed line in the region where there is a steep drop in efficiency caused by the air flow reaching sonic velocity. In the choke regime, the turbo operates smoothly but the pressure ratio and efficiency fall, and temperatures rise. The nearly horizontal lines (23) are lines of equal turbocharger speed.

Line 27 is the example engine operating line. This line shows, for a given set of conditions, where the map fits the air requirements of the engine operating regime. FIG. 2 represents a turbocharger map, with the engine operating line marked on it. This would be for the case of a fixed turbocharger. By fixed, what is meant is that the turbocharger has matching limits set only by the choice of wheels and housings; there are no control devices. FIG. 3 shows the same basic map but the turbocharger is equipped with a wastegate which limits the boost to, in the case of the example, a pressure ratio of 3.43. In this case the engine operating line (28), FIG. 3 follows the engine operating line (27) of FIG. 2 until the wastegate opens, then the engine operating line curves at the point of wastegate opening to a more horizontal line, representing limited pressure ratio.

The design of the turbine stage is a compromise between the power required to drive the compressor, the aerodynamic design of the stage, the inertia of the rotating assembly, of which the turbine is a large part; the turbocharger operating cycle which affects the structural and material aspects of the design; and the near field both upstream and downstream of the turbine wheel with respect to blade excitation.

Engine boost requirements are the predominant driver of compressor stage selection. The selection and design of the compressor is a compromise between the boost pressure requirement of the engine; the mass flow required by the engine; the efficiency required by the application; the map width required by the engine and application; the altitude and duty cycle the engine is to be subjected; the cylinder pressure limits of the engine; etc.

There are many specifics outside of the turbocharger which cause there to be limits placed upon the turbocharger. Limitations of the engine, such as cylinder pressure limits may mean that the boost level needs to be held below a maximum allowable pressure at any point in the engine operating regime. Altitude limits may generate the need to control turbocharger speeds for structural reasons. Marketing forces may cause there to be a need for a modifiable boost level control.

There are engine limiting factors, within the events of combustion, both internal and external to the combustion chamber. Some of these factors are: the intake of the air charge; the compression of the air charge; the expansion and exhaust strokes of the engine; the compression ratio; the injection of fuel; the shape, timing and nature of the injection plume; the ignition of fuel; and the characteristics of the ignition, be it initiated by compression or spark; the location and design of the sealing rings; the design of the piston crown and cylinder head; basin, bowl bump, flat, hemispherical, swirl initiating, non swirl, stratified, homogeneous; the air-fuel ratio; etc. The cylinder pressure limits are usually controlled by features in the engine design such as exhaust sealing methods and materials, valve, and valve seat materials, piston design, piston ring design, cylinder temperature, cylinder head cooling and structural limitations, heat, transfer rates and knock in spark ignition engines. As mentioned above, the cylinder pressure limits are a predominant driver of the need for wastegates.

The inertia of the rotating assembly is predominantly the inertia of the turbine wheel. The moment of inertia is the sum of the separate inertias taken at distinct slices through the part.

The Moment of Inertia $I = \Sigma M \cdot R^2$

Where M is the mass of the section in question and

R is the radius of the section.

The reason this is important to turbocharger operation is that the addition of a wastegate to the turbine stage allows matching to the low speed range, with a smaller turbine wheel and housing and thus the addition of a wastegate brings with it the option for a reduction in inertia. Since a reduction in inertia of the rotating assembly typically results in a reduction of particulate matter (PM). Wastegates have become common in on-highway vehicles. The problem is that most wastegates are somewhat binary in their operation which does not fit well with the linear relationship between engine output and engine speed.

As explained above there are many reasons for incorporating wastegates:
1. To limit maximum cylinder pressure, the wastegate can be a simple device which simply limits boost and thus the mass flow of air provided to the combustion chamber.
2. To limit maximum cylinder temperature the wastegate can be used as a simple device to limit the air mass flow intake and thus the A/F ratio and combustion temperature.
3. To allow marketing to change power setting of engines. By simply changing the seat pressure of the actuator spring, at the time of assembly of the turbocharger, the point at which the wastegate begins to open can be relatively easily changed, with minimal part number changes.
4. To fine tune the power settings of the engine. When an engine is assembled there exists a range of variables, in all parts of the engine, due to tolerances build up, which change the power produced by the engine. Since Diesel engines are sold by fractional power ratings eg 112 kW, 130 kW, 142 kW, 149 kW, the use of the infinite variation of set points available with a wastegate is a powerful fine-tuning tool. For example when an engine first goes to production, the tolerances of all the production components, differentiated from the prototype components, often produces an engine with different power and torque. Instead of having to change components to make the target settings, the wastegate setting can just be altered quickly, thus not delaying production of a certified engine. The problem with this "easy fix" is that since the simple flat faced valve and seat design does not modulate flow well with valve opening angle the operation of the wastegate can be coarse.

Wastegates come in two basic configurations; a poppet type valve and a swing valve type. FIG. 4A depicts a typical swing valve wastegate in which the valve (31) is affixed to a valve arm (33) such that the valve is free to move so that it seals on a seat (32) machined into the housing (30). The housing is typically a cast iron or steel turbine housing or exhaust manifold through which flows exhaust gas (35) upstream of the turbine wheel. Machined into the housing is a pivot (34) about which the valve arm (33) may rotate. When the wastegate is commanded closed, the valve arm (33) is driven to the closed position by an actuator mechanically connected to the valve arm (33) such that the valve (31) seals on its seat (32) and no exhaust gas can escape from the housing (30).

When the wastegate is commanded to open (FIG. 4B) the actuator moves such that the valve arm (33) rotates to position (33A) allowing exhaust gas (35) to flow both through the valve orifice in a direction (35B) out of the housing (30) with the remaining exhaust gas (35A) free to travel still in the housing (30). Thus the flow (35) through the housing with the wastegate valve closed is greater than the flow (35A) through the housing with the wastegate valve open. This reduces the energy available to drive the turbine wheel.

FIG. 5A depicts a typical poppet valve wastegate in which the valve (41) is guided in a housing (48) by a sleeve (47) such that the valve is free to move perpendicular to its seat, such that it seals on a seat (42) machined into the housing (40). The housing is typically a cast iron or steel turbine housing or exhaust manifold through which flows exhaust gas (45) upstream of the turbine wheel. The wastegate housing (48) typically mounts a pneumatic diaphragm which can drive the valve (41) by either pressure or vacuum, depending upon the engine choice. When the wastegate is commanded closed, the valve (41) is driven to the closed position by the actuator mechanically connected to the valve (41) such that the valve (41) seals on its seat (42) and no exhaust gas can escape from the housing (40).

When the wastegate is commanded to open (FIG. 5B) the actuator moves such that the valve (41) is lifted off its seat (42) to position (41A) allowing exhaust gas (45) to flow both through the valve curtain in a direction (45B) out of the housing (48) through orifices cut in the housing to allow the gas (46) to escape to atmosphere, with the remaining exhaust gas (45A) free to travel still in the housing (40). Thus the flow (45) through the housing with the wastegate valve closed is greater than the flow (45A) through the housing with the wastegate valve open. This reduces the energy available to drive the turbine wheel. Since the escaping exhaust gas can only flow through the cylindrical orifice between the valve head and the valve seat, the flow change for a given valve displacement is not very linear.

FIG. 7 depicts the invention in its most simple form. The valve top (31), which affixes the valve to the valve arm (33) is as before. The lower part of the valve (90) is modified to take the shape of a horn. The valve opens in the same manner as before (FIG. 4A, 4B) but now the airflow from the duct flows in the direction (35) around the horn (90) so that the escaping air flows in the annular orifice between the outside surface of horn (90) and the inside surface of the port (37).

By incorporating smart controls and feedback on the valve position, this crude motion can be tailored to a finer modulation. But that adds significant cost to the engine since the electronics must live in a hostile environment of exhaust gas at approximately 860° C. to 1050° C. and vibration, both of which are hostile environments for electronics. Thus there is a need for a simple, finely modulated exhaust gas control.

SUMMARY OF THE INVENTION

The invention produces a more progressive (consistent, most optimally near-linear) curve of turbocharger boost-to-valve opening than possible with the typical wastegate valve. The addition of a three-dimensional shape in the flow path from the duct, through the valve, is a far more cost-effective solution to acquire linear flow than very finite, accurate electrical control of the valve position.

BRIEF DESCRIPTION OF THE DRAWINGS

The present invention is illustrated by way of example and not limitation in the accompanying drawings in which like reference numbers indicate similar parts, and in which:

FIG. 4A and FIG. 4B show a section of the flow path in a turbine housing or manifold with a swing valve type wastegate mounted upon it. In FIG. 4A the valve is closed and in FIG. 4B the valve is open;

FIG. 5A and FIG. 5B show a section of the flow path in a turbine housing or manifold with a poppet valve type wastegate mounted upon it. In FIG. 5A the valve is closed and in FIG. 5B the valve is open;

FIG. 10A is a male parabolic shape; FIG. 10B is a cylinder with a conical end, and FIG. 10C is has only a conical horn;

DETAILED DESCRIPTION OF THE INVENTION

The invention discusses a novel change to both swing valve type and poppet type wastegates. Since the swing valve is the more common variety of wastegate, being more cost-effective to produce in volume, it is that variety which will be dealt with in this application. The person of ordinary skill will easily apply the principles illustrated with reference to the swing valve to the poppet type wastegate or any other type wastegate.

By incorporating a three dimensional horn on the face of the valve the opening of the valve, at both low and high degrees of opening, can be made to modulate exhaust gas flow in a more precise manner.

Figure 1:
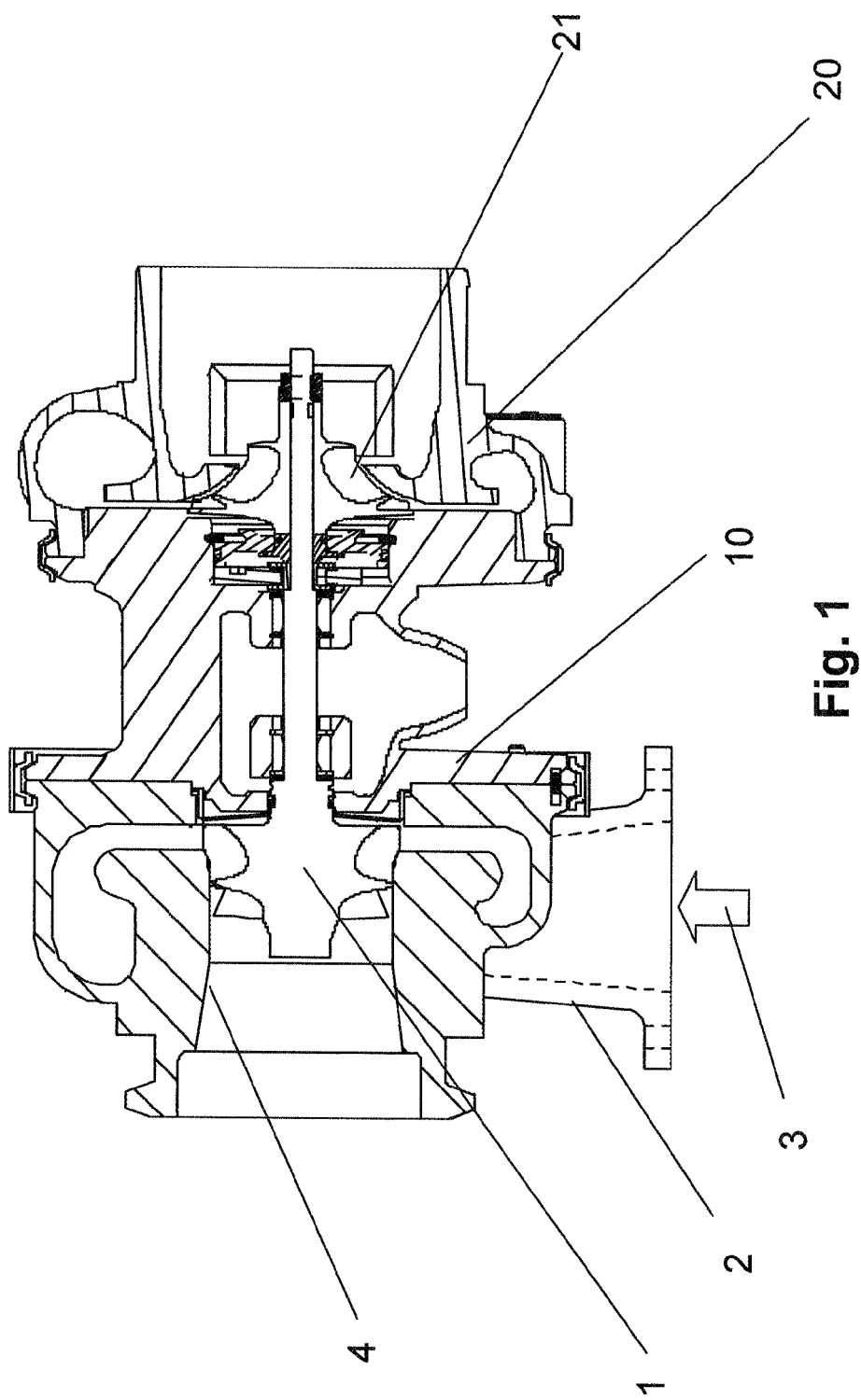
FIG. 1 depicts the section for a typical turbocharger.
Figure 2:
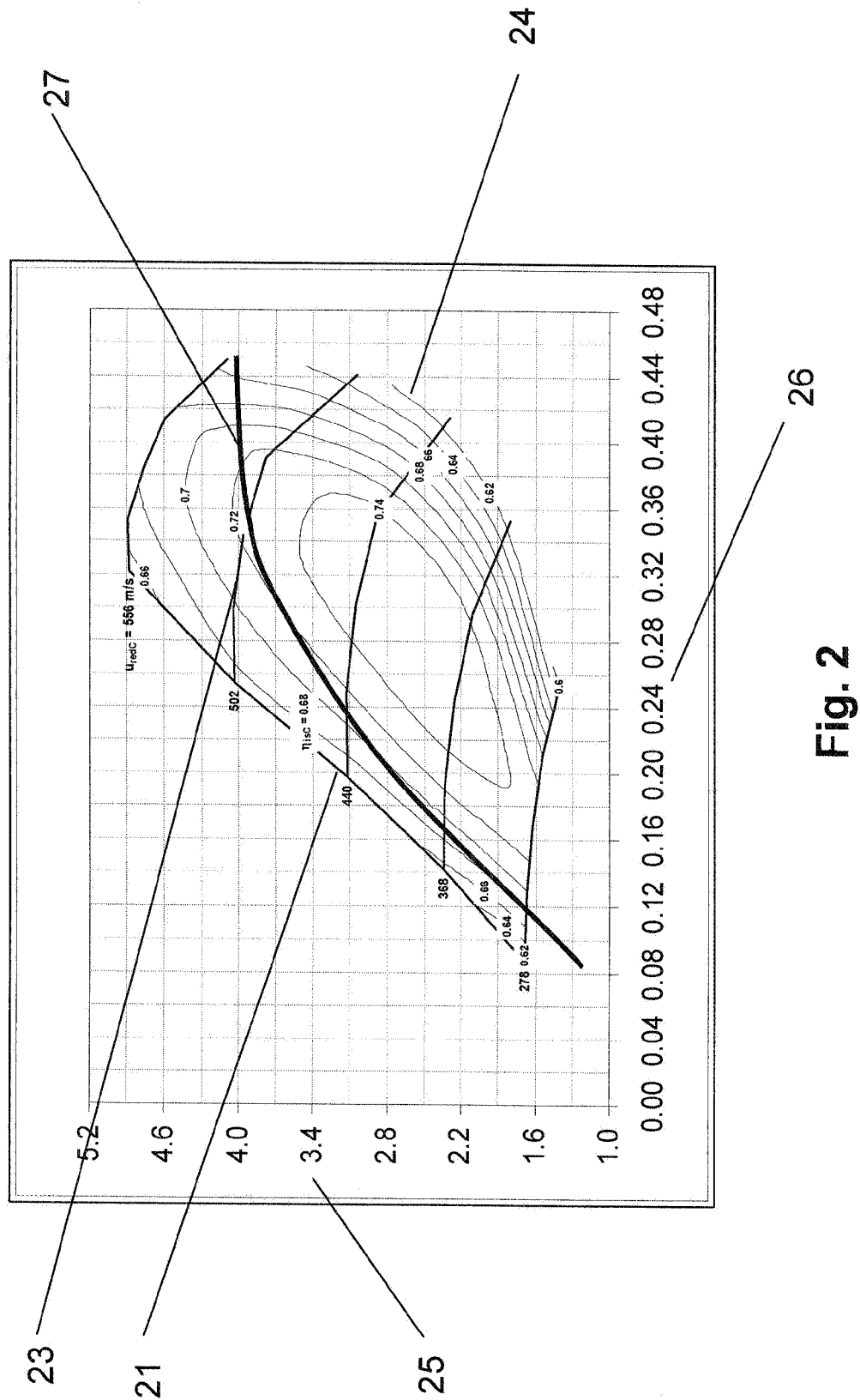
FIG. 2 is a typical compressor map with a typical engine operating line superimposed upon it.
Figure 3:
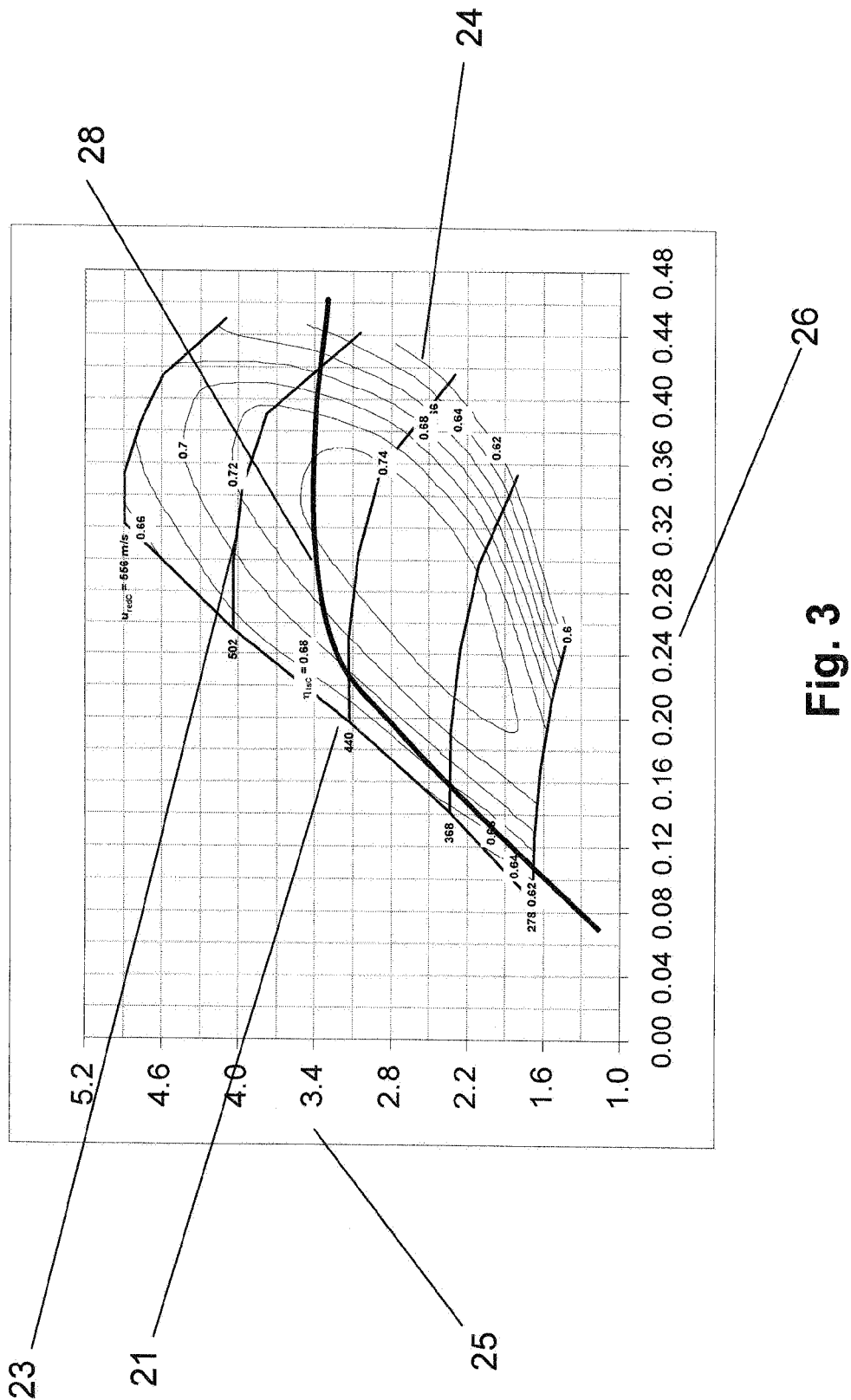
FIG. 3 is a typical compressor map with a typical engine operating line, modified by the fitting of a wastegate, superimposed upon it.
Figure 6:
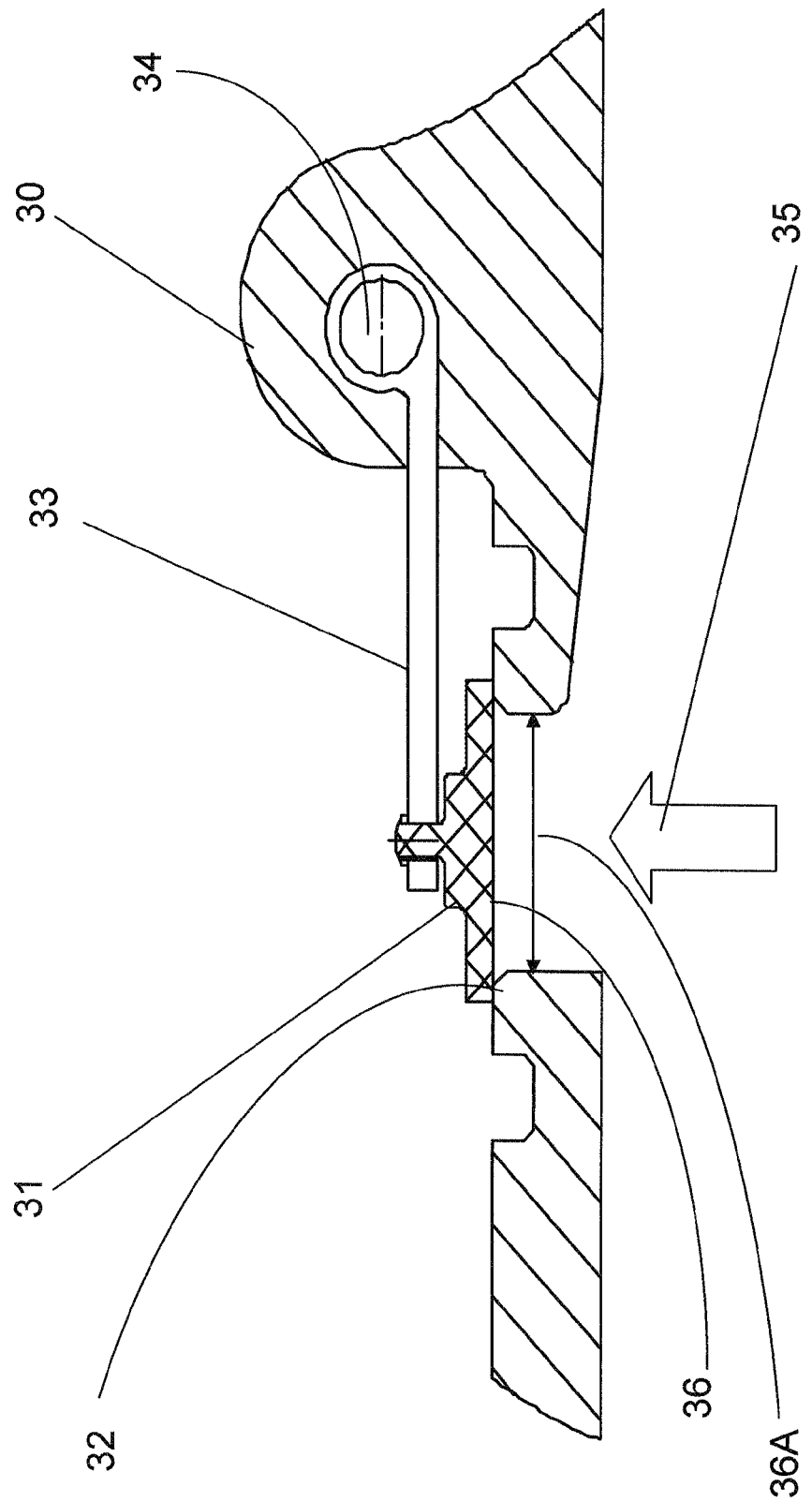
FIG. 6. is a section magnifying the details around the typical swing valve.

FIG. 6 depicts the configuration of a typical swing valve wastegate. The valve head (31) typically presents a flat face 36, of effective diameter (36A) to the sealing face (32) as it is the most cost-effective manufacturing solution. When the valve is open (see FIG. 5 33A) the exhaust gas flows out of the duct in a direction (35) towards the valve face (36) through the port (37). The basic geometry of the wastegate valve and its pivot means that the valve head (31) slides a little on the face (32) before the motion of the valve arm (33) about its pivot (34) lifts the valve face off the seat. The main reason for a flat seat is that in the casting of wastegate features in a turbine housing there must be allowance for core shift. The wastegate uses features on at least two different cores so the features may have relative movement of 1/16" to 1/8" in normal casting practice. To get around this movement, a flat faced valve, with sufficient overlap, is a cost effective solution.

Figure 7A:
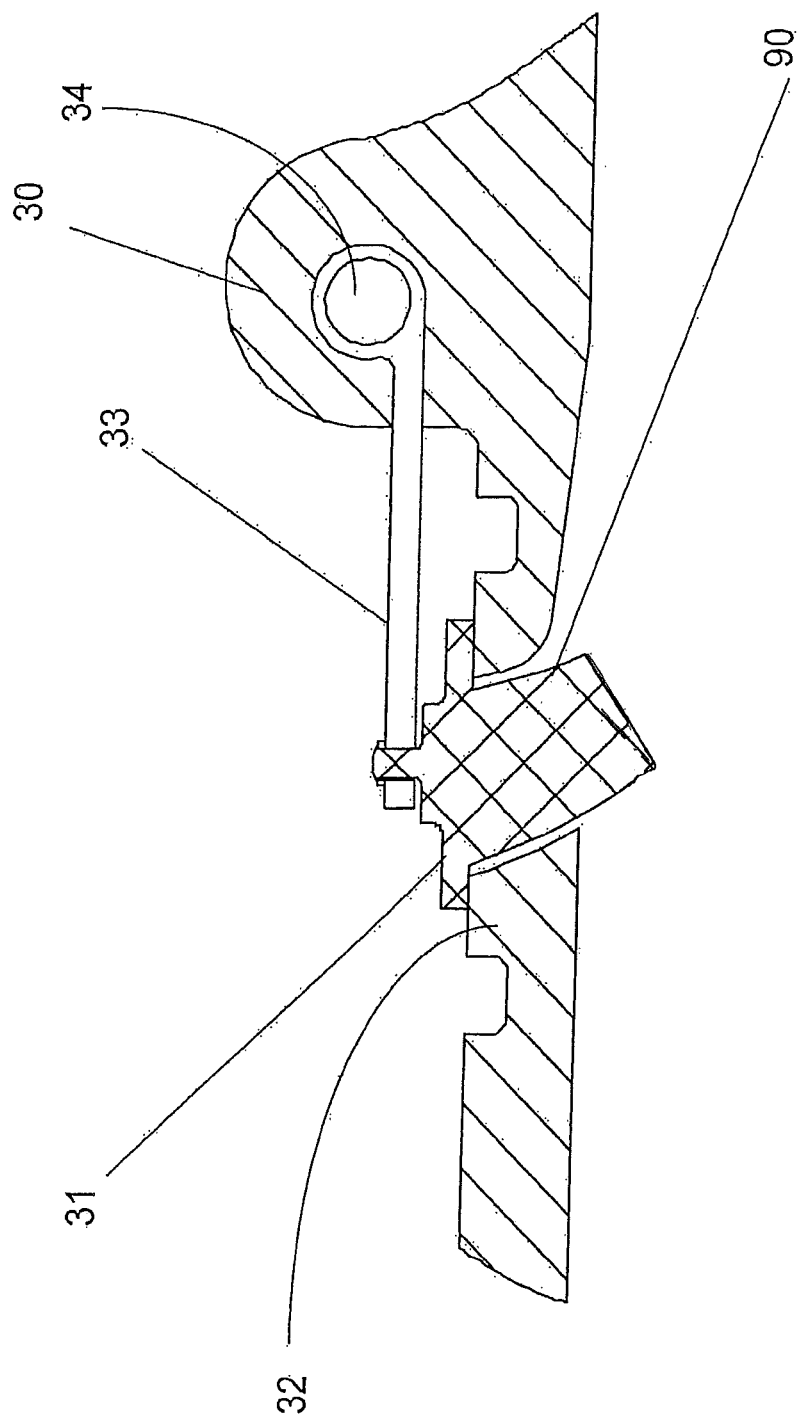
FIG. 7A and FIG. 7B show a section, with FIG. 7A magnifying the details of a horn attached to the typical swing valve configuration in the closed position, and with FIG. 7B showing the valve in open position.
Figure 7B:
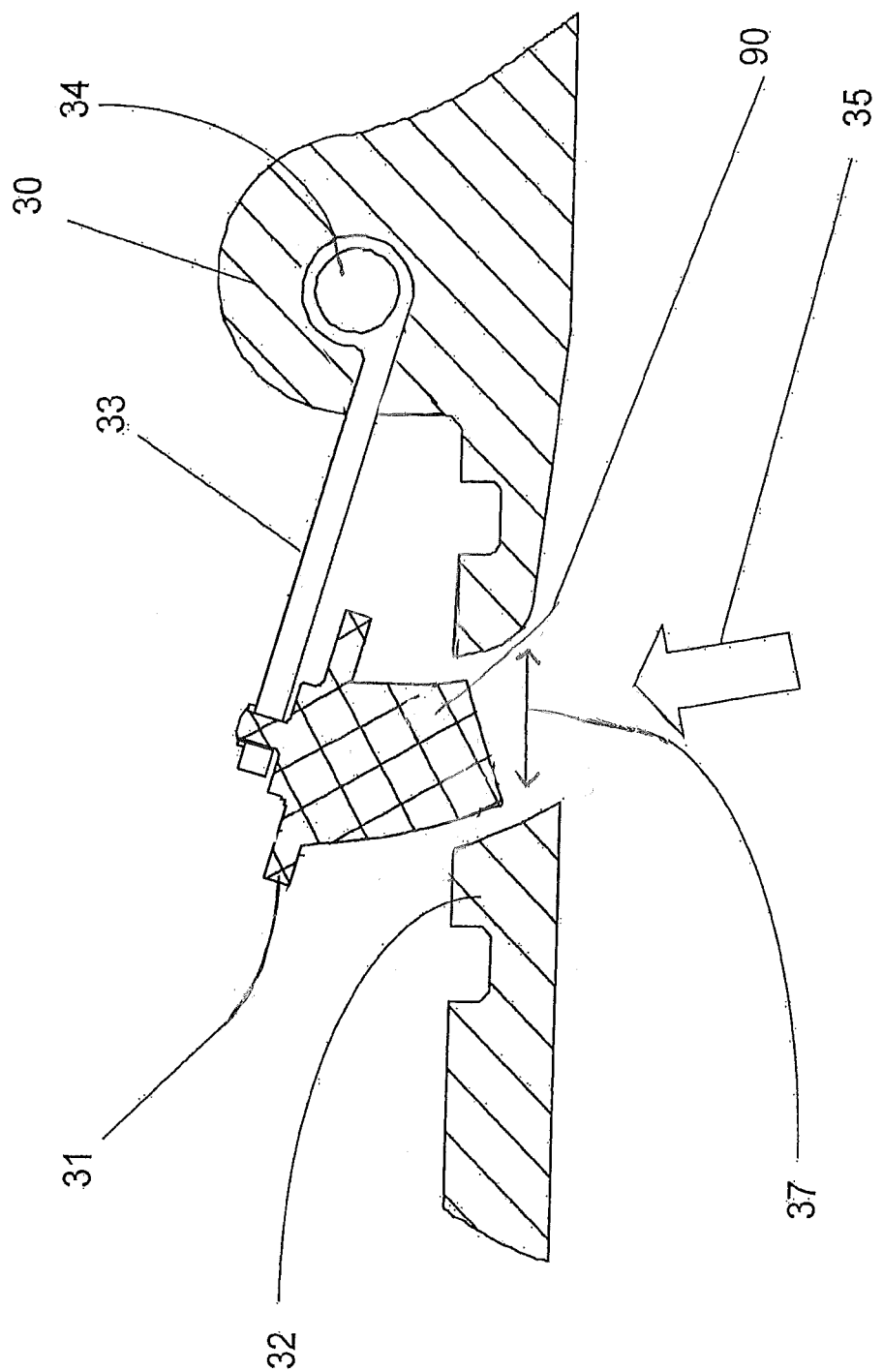

FIG. 7A depicts the invention in its most simple form. The valve top (31), which affixes the valve to the valve arm (33) is as before. The lower part of the valve (90) is modified to take the shape of a horn. The valve opens in FIG. 7B in the same manner as before (FIG. 4B) but now the airflow from the duct flows in the direction (35) around the horn (90) so that the escaping exhaust flows in the annular orifice between the outside surface of horn (90) and the inside surface of the port (37).

The horn includes a base which has the same dimension as the orifice. The orifice may be quadratic, oval, elliptical or round or any shape. The diameter of the base of the horn is measured as the smallest cross-section through the geographic center, thus, the width (w) in the case of a rectangular base, or a diameter (d) in the case of a circular base. The elevation (e) of the horn is measured in the direction the valve moves in the direction of closing. The elevation is not particularly limited, but is preferable at least one half the width, most preferably equal to or greater than the width.

Figure 8:
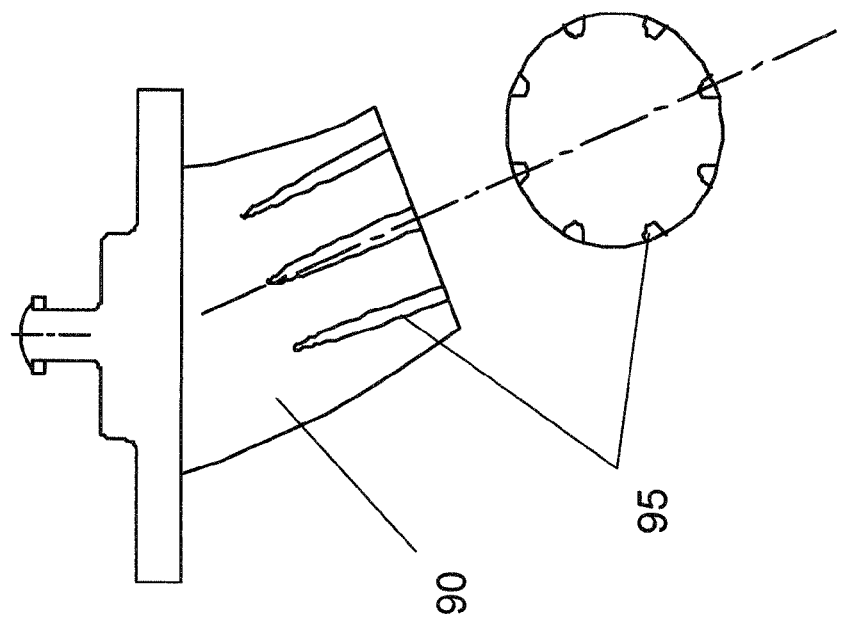
FIG. 8A and FIG. 8B depict a pair of embodiments of the invention. The image 8A depicts an additional internal flow path, the image 8B depicts and additional external flow path.
Figure 8:
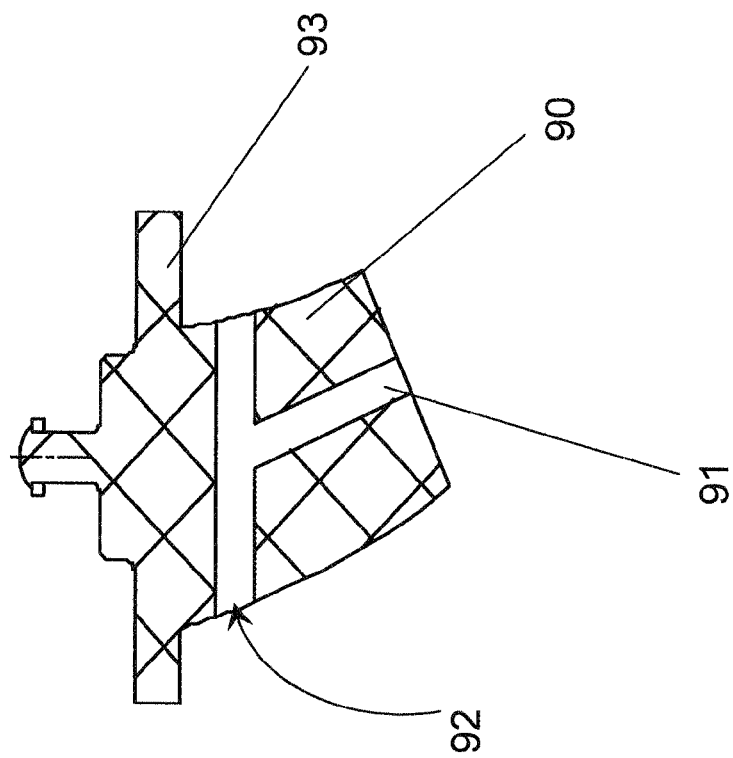
Figure 9:
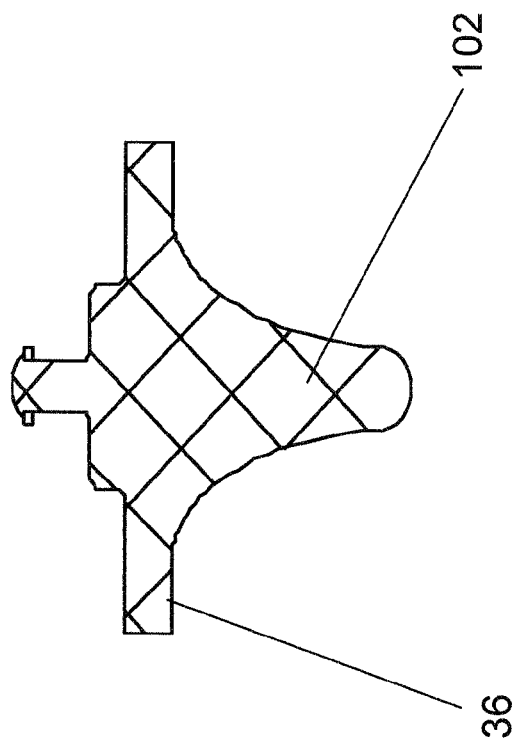
FIG. 9A and FIG. 9B depict a pair of embodiments of the invention. In these views the image 9A depicts an asymmetric, curved parabolic horn. The image 9B depicts a symmetric parabolic horn.
Figure 9:
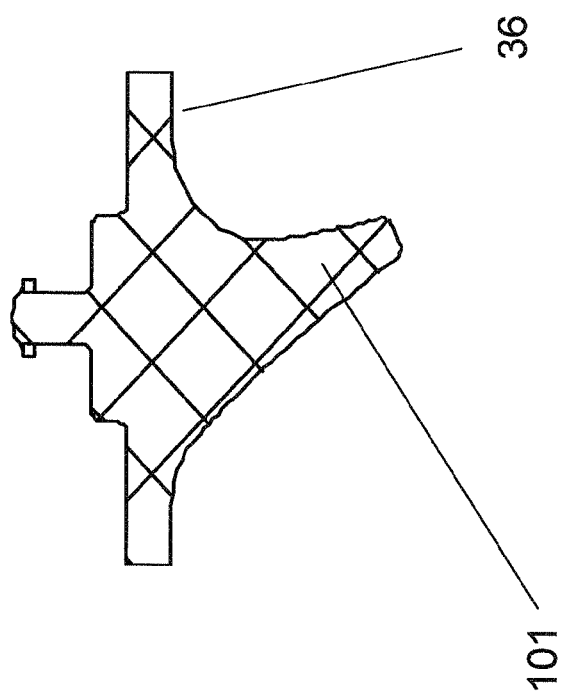
Figure 10:
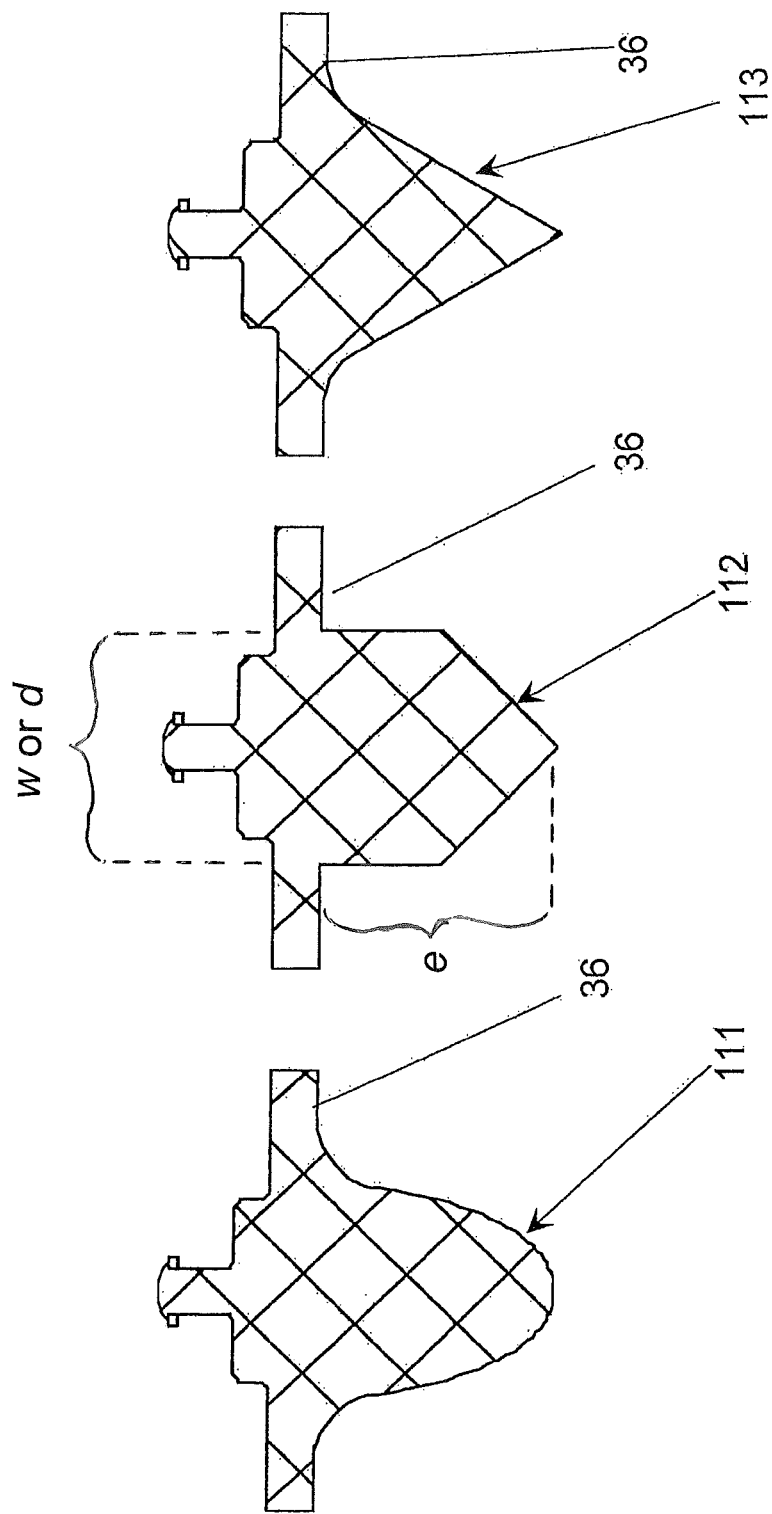
FIG. 10A, FIG. 10B and FIG. 10C depict three more embodiments of the invention.
Figure 11:
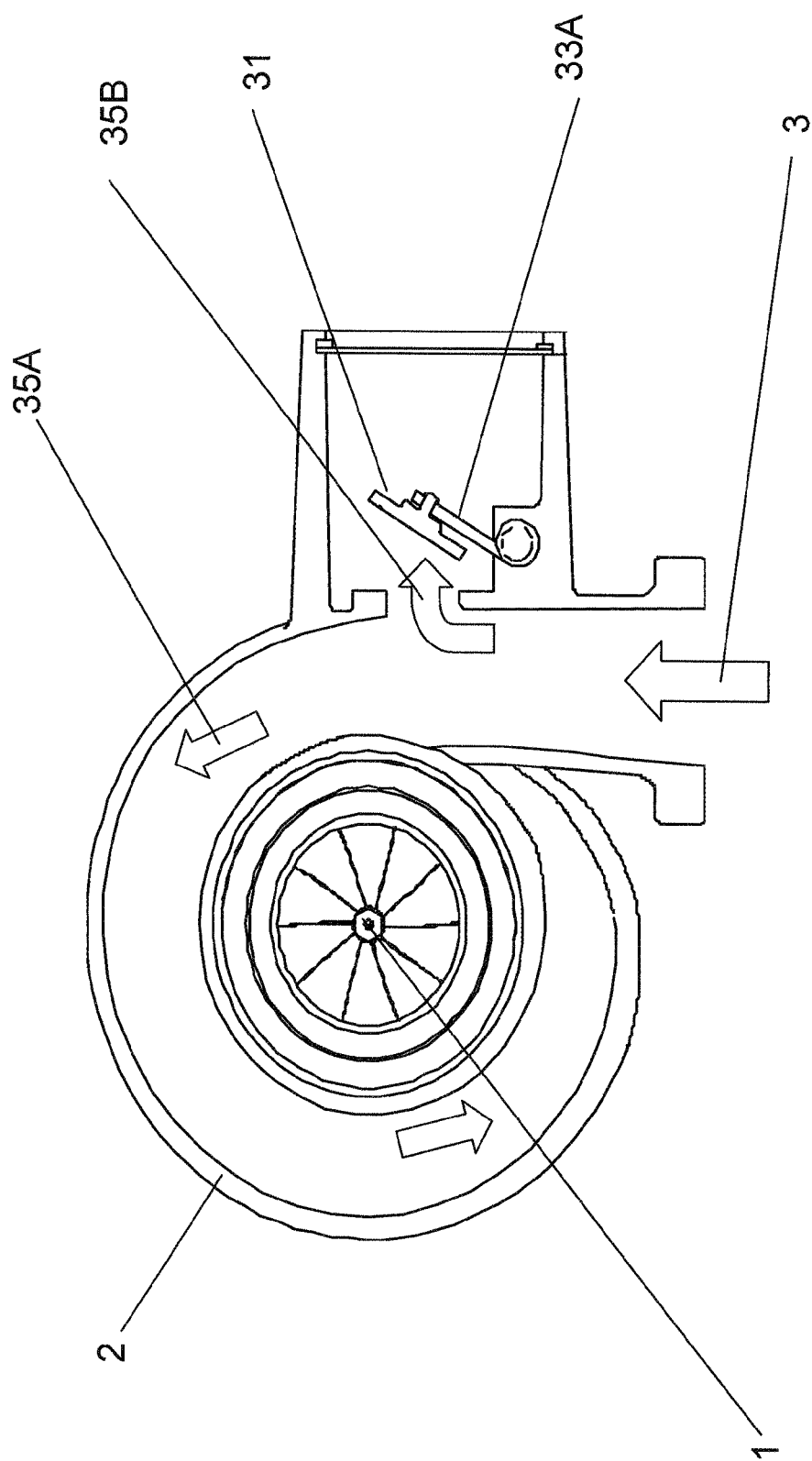
FIG. 11. depicts the position of a typical wastegate mounted on a typical turbine housing.
Figure 12:
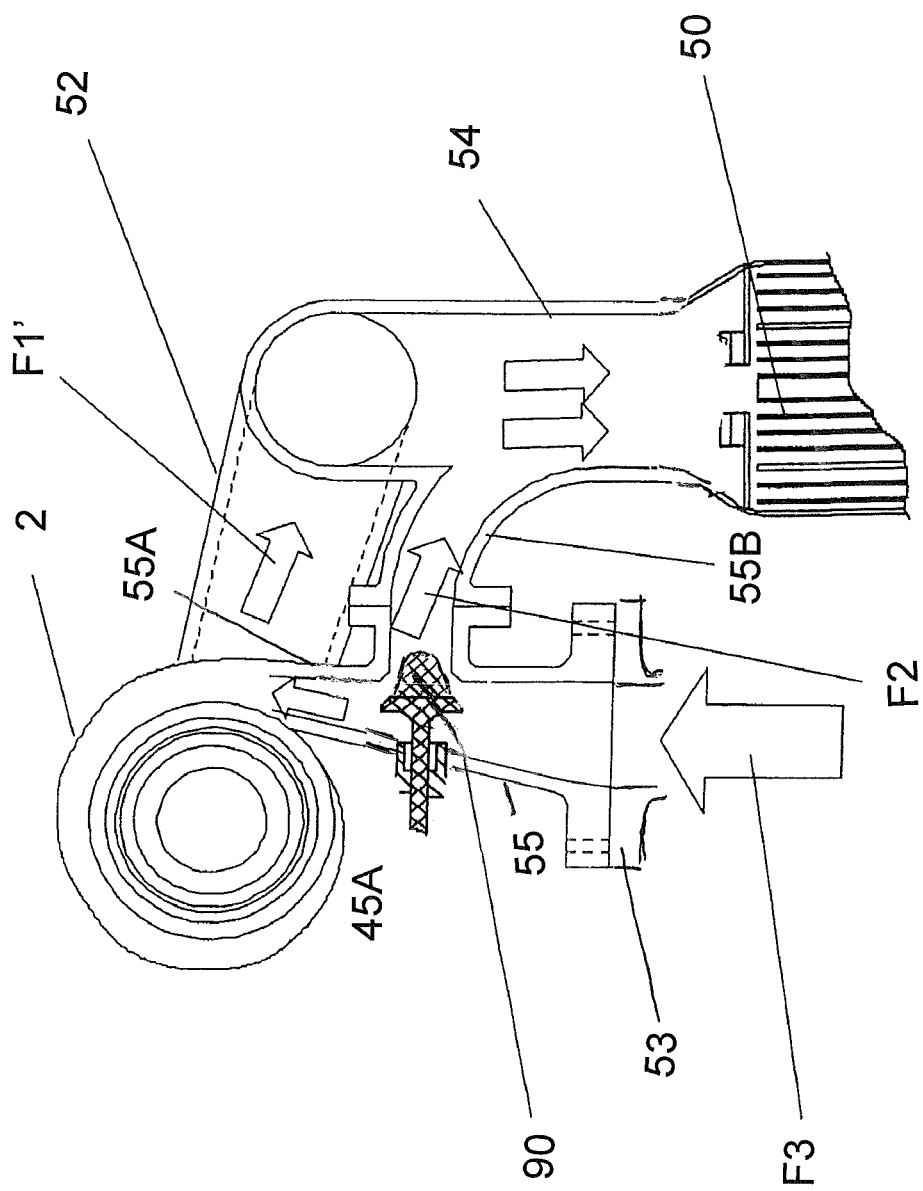
FIG. 12. depicts the exhaust flow branching into first and second flow streams, regulated by a waste gate.

Horn shapes illustrated in FIGS. 8-10 illustrate that it is not necessary that the horn take a simple, e.g., pyramidal or conical shape. Alternate surfaces and configurations may be used to produce a more manageable boost curve for a simply actuated wastegate.

In the embodiment in FIG. 8A, a plurality of exhaust ports (92), interconnected to one or more inlet port holes (91) are fabricated in the horn (90) to increase the mass flow through the valve system. The exhaust ports can be on one or more planes so that as the valve horn lifts out of the port, more of the exhaust ports are uncovered.

In the embodiment in FIG. 8B the internal ports are replaced by indentations (95) fabricated into the outer wall of the horn (90). The indentations may be cast into the horn for cost reduction reasons. The indentations may be full length or part length. The indentations may vary by count, shape and depth.

In the embodiment in FIG. 9 an inside parabolic shape is used to form the horn. In one form (101) the parabolic shape follows the centerline of the horn, in another form of this embodiment the parabolic shape follows a centerline perpendicular to the former valve face (36).

In the embodiments shown in FIG. 10, the horn can take the shape of an outside parabolic description (111), or a conical or pointed end of a cylinder (112), or a cone (113).

The horn may be solid or hollow. The actuator may be any conventionally employed electric or pneumatic or mechanical actuator. The method of operation is within the skill of those in the art. The present invention differs from the prior art in the addition of the horn which de-restricts (reduces flow-through cross-section) the orifice more gradually than a conventional flat valve.

The invention is further embodied by a wastegate exhaust gas control system for an internal combustion engine, said internal combustion engine including an intake manifold and an exhaust manifold and further comprising: an exhaust duct (55) connected to the exhaust manifold (53) and bifurcated at a branch point into a first branch (55A) and second branch (55B). The first branch (55A) of the duct is fluidly connected to a turbocharger (2). The second branch (55B) of the duct is fluidly connected to atmosphere, optionally via an exhaust purifier (50). A wastegate is disposed in the exhaust duct at the branch point. Control means are provided for controlling the wastegate for directing variable proportions of exhaust flow (F3) between the first and second branches of the duct. The wastegate comprises a valve moveable between an open and a closed position, and an orifice defined by a seat dimensioned to receive the valve when in the closed position. The valve includes a horn (90) extending into the orifice when the valve is in the closed position. When the valve is open, exhaust may flow (F2) into the second branch. When the valve is closed, exhaust may flow (F1) into the turbine housing, out the turbine exducer, and flow (F1') into piping (52) communicating with the exhaust pipe (54). Exhaust then flows to atmosphere, optionally through exhaust purifier (50).

Although a wastegate has been described herein with great detail with respect to an embodiment suitable for the automobile or truck industry, it will be readily apparent that the wastegate and the process for production thereof are suitable for use in a number of other applications, such as steam engines and fuel cell powered vehicles. Although this invention has been described in its preferred form with a certain of particularity with respect to a wastegate valve, it is understood that the present disclosure of the preferred form has been made only by way of example and that numerous changes in the details of structures and the composition of the combination may be resorted to without departing from the spirit and scope of the invention.

Now that the invention has been described,
I claim:

1. A wastegate for a turbocharged internal combustion engine system, comprising
   a wastegate housing having a passage defining a path for the flow of exhaust gases from an inlet end of the passage to an outlet end of the passage, and
   a valve (31) mounted to the passage for movement between a closed position wherein said valve is seated in an orifice (32) and blocks the flow of exhaust gases through the passage and an open position that allows the flow of exhaust gases through the passage, and
   an actuator controlling the movement of the valve,
   wherein the valve (31) includes a horn (90) extending in the direction of valve closure, wherein said horn has a base diameter and an elevation measured from said base, wherein the elevation of the horn (90) measured in the direction of valve closure is equal to or greater than one-half the diameter of the base, and wherein movement of said horn from said closed toward said open position progressively de-restricts said orifice.

2. The wastegate as in claim 1, wherein said horn (90) tapers outward from said base.

3. The wastegate as in claim 1, wherein the elevation of the horn (90) measured in the direction of valve closure is equal to or greater than the diameter of the base.

4. The wastegate as in claim 1, wherein said horn (90) includes at least one through-going bore.

5. The wastegate as in claim 1, wherein said horn (90) includes grooves or ridges over at least a part of the surface of the horn oriented in the direction of movement of the horn.

6. The wastegate as in claim 1, wherein the cross-sectional area of flow measured at said orifice progressively increases as said valve progressively moves from said closed toward said open position.

7. The wastegate as in claim 1, wherein said horn progressively de-restricts said orifice as said valve is moved from said closed toward said open position.

8. The wastegate as in claim 1, wherein said wastegate housing inlet end is in communication with exhaust gas flow upstream of a turbocharger, and said outlet end of said housing is in communication with exhaust gas flow downstream of said turbocharger.

9. A wastegate for a turbocharged internal combustion engine system, comprising
   a wastegate housing having a passage defining a path for the flow of exhaust gases from an inlet end of the passage to an outlet end of the passage, and
   a swing gate pivotally mounted to the passage for movement between a closed position that blocks the flow of exhaust gases through the passage and an open position that allows the flow of exhaust gases through the passage, and
   an actuator connected to the wastegate housing for controlling the movement of the swing gate,
   wherein the swing gate includes a horn extending from said swing gate generally in the direction of valve closure, wherein said horn has a base diameter and an elevation measured from said base, wherein the elevation of the horn perpendicular to the base is equal to or greater than one-half the diameter of the base, and wherein movement of said horn from said closed toward said open position progressively de-restricts said orifice.

10. A wastegate exhaust gas control system for an internal combustion engine, said internal combustion engine including an intake manifold and an exhaust manifold and further comprising:
    an exhaust duct connected to said exhaust manifold and bifurcated at a branch point into a first and second branch;
    said first branch of said duct connected to a turbocharger;
    said second branch of said duct connected to atmosphere, optionally via an exhaust purifier;
    a wastegate disposed in said exhaust duct at said branch point; and
    means for controlling said wastegate for directing variable proportions of said exhaust between said first and second branches of said duct,
    wherein said wastegate comprises a valve (31) moveable between an open and a closed position, and an orifice defined by a seat (32) dimensioned to receive said valve when in the closed position, wherein said valve includes a horn (90) extending into said orifice when said valve is in the closed position.

11. The system as in claim 10, wherein said horn has a base diameter and an elevation measured from said base, and wherein said horn tapers outward from said base.

12. The system as in claim 10, wherein said horn has a base diameter and an elevation measured from said base, and wherein the elevation of the horn perpendicular to the orifice is equal to or greater than the diameter of the base.

13. The system as in claim 10, wherein said horn has a base diameter and an elevation measured from said base, and wherein the elevation of the horn perpendicular to the base is equal to or greater than one-half the diameter of the base.

14. The system as in claim 10, wherein the cross-sectional area of flow measured at said orifice progressively increases as said valve progressively moves from said closed to said open position.

15. The system as in claim 10, wherein said horn progressively de-restricts said orifice as said valve is moved from said closed toward said open position.

* * * * *